United States Patent
Li et al.

(10) Patent No.: US 11,940,561 B2
(45) Date of Patent: Mar. 26, 2024

(54) LASER RECEIVING DEVICE AND LIDAR COMPRISING A PLURALITY OF ISOLATION PARTS FOR ELECTROMAGNETIC SHIELDING BETWEEN ADJACENT SENSOR GROUPS AND BETWEEN ADJACENT AMPLIFIER GROUPS

(71) Applicant: SUTENG INNOVATION TECHNOLOGY CO., LTD., Shenzhen (CN)

(72) Inventors: Yanmin Li, Shenzhen (CN); Zhen Zhang, Shenzhen (CN); Shengqiang Pan, Shenzhen (CN)

(73) Assignee: SUTENG INNOVATION TECHNOLOGY CO.,LTD., Shenzhen (CN)

( * ) Notice: Subject to any disclaimer, the term of this patent is extended or adjusted under 35 U.S.C. 154(b) by 307 days.

(21) Appl. No.: 17/551,012

(22) Filed: Dec. 14, 2021

(65) Prior Publication Data
US 2022/0107394 A1    Apr. 7, 2022

Related U.S. Application Data

(63) Continuation-in-part of application No. PCT/CN2020/099033, filed on Jun. 29, 2020.

(51) Int. Cl.
*G01S 7/48* (2006.01)
*G01S 7/481* (2006.01)

(52) U.S. Cl.
CPC .......... *G01S 7/4816* (2013.01); *G01S 7/4813* (2013.01); *G01S 7/4817* (2013.01)

(58) Field of Classification Search
CPC . G01S 7/48; G01S 11/00; G01S 13/00; G01S 17/00; G01S 17/02; G01S 17/88;
(Continued)

(56) References Cited

U.S. PATENT DOCUMENTS

| 5,953,110 A | 9/1999 | Burns |
| 2011/0216304 A1 | 9/2011 | Hall |

(Continued)

FOREIGN PATENT DOCUMENTS

| CN | 209280923 U | 8/2019 |
| CN | 110376568 A | 10/2019 |
| CN | 110678780 A | 1/2020 |

OTHER PUBLICATIONS

International Search Report issued in corresponding International Application No. PCT/CN2020/099033, dated Mar. 25, 2021, 5 pages.

(Continued)

*Primary Examiner* — Que Tan Le
(74) *Attorney, Agent, or Firm* — BAYES PLLC

(57) ABSTRACT

The present disclosure relates to a laser receiving device and a LiDAR. An isolation component is provided between a plurality of parallel sensor groups, and an isolation component is provided between a plurality of amplifier groups in parallel, so that a plurality of parallel receiving channels each form an independent current loop, thereby reducing noise crosstalk among signal receiving channels and improving the signal-to-noise ratio of the laser receiving device.

11 Claims, 12 Drawing Sheets

(58) Field of Classification Search
CPC ...... H01L 27/146; H04N 25/70; H04N 25/77; H04N 25/78
USPC .................................. 250/214 R, 221, 208.1
See application file for complete search history.

(56) References Cited

U.S. PATENT DOCUMENTS

2013/0214126 A1* 8/2013 Kobayashi ........ H01L 27/14623
250/208.1
2020/0158830 A1 5/2020 Asghari et al.

OTHER PUBLICATIONS

First Ofice Action issued in related Chinese Application No. 202080005458.X, dated Apr. 8, 2023, 15 pages.
Second Office Action issued in related Chinese Application No. 202080005458.X, dated Aug. 1, 2023, 7 pages.

* cited by examiner

LASER RECEIVING DEVICE AND LIDAR COMPRISING A PLURALITY OF ISOLATION PARTS FOR ELECTROMAGNETIC SHIELDING BETWEEN ADJACENT SENSOR GROUPS AND BETWEEN ADJACENT AMPLIFIER GROUPS

CROSS-REFERENCE TO RELATED APPLICATION

The present application is a continuation-in-part of International Application No. PCT/CN2020/099033, filed on Jun. 29, 2020, which is incorporated herein by reference in its entirety.

TECHNICAL FIELD

The present disclosure relates to the technical field of laser detection, and in particular, to a laser receiving device and LiDAR.

BACKGROUND

LiDAR is a radar system that emits a laser beam to detect the position and speed of an object. For the working principle of the LiDAR, the LiDAR first emits a detection laser beam to the object. A receiver receives signals reflected from the object. Then LiDAR compares signals reflected from the object with transmitted signals, and properly processes the signals to obtain relevant information of the object, such as distance, azimuth, height, speed, attitude, shape and other parameters of the object.

A multi-line LiDAR can transmit and receive a plurality of laser beams at the same time and is widely used because of its high scanning efficiency. For a laser receiving device of the multi-line LiDAR, as the volume of the LiDAR decreases, a sensor array becomes smaller and is densely arranged. How to improve the signal-to-noise ratio of the laser receiving device is currently an urgent problem to be solved.

SUMMARY

Embodiments of the present disclosure provide a laser receiving device, which can cause a plurality of parallel receiving channels in a multi-line LiDAR to each form an independent current loop, respectively, thereby reducing noise crosstalk between signal receiving channels, and improving the signal-to-noise ratio of the laser receiving device.

In order to solve the above technical problems, embodiments of the present disclosure disclose the following technical solutions.

In a first aspect, this application provides a laser receiving device, including:

a photoelectric sensing assembly, including m receiving sensor plates and n sensor groups, wherein the n sensor groups are arranged on the m receiving sensor plates, and wherein when two adjacent sensor groups are arranged on the same receiving sensor plate, a first isolation part for electromagnetic shielding is arranged between the two adjacent sensor groups, where m is an integer greater than zero, n is an integer greater than 1, and m≤n;

an amplifying assembly, including k receiving amplifier plates and n amplifier groups, wherein the n amplifier groups are arranged on the k receiving amplifier plates, wherein when two adjacent amplifier groups are arranged on the same receiving amplifier plate, a second isolation part for electromagnetic shielding is provided between the two adjacent amplifier groups, and wherein the n amplifier groups and the n sensor groups are connected in a one-to-one manner, where k is an integer greater than or equal to 1, and k≤n;

a collecting assembly, including a collecting plate and n collecting units, wherein the n collecting units are arranged on the collecting plate, and wherein the n collecting units and the n amplifier groups are connected in a one-to-one manner; and n power supply units, configured to supply power to the photoelectric sensing assembly and the amplifying assembly, wherein the n power supply units are connected to the n amplifier groups in a one-to-one manner, and wherein the n power supply units are connected to the n sensor groups in a one-to-one manner, and wherein the photoelectric sensing assembly and the amplifying assembly are grounded via a same ground plane.

Optionally, m=1, the n sensor groups are arranged on the same receiving sensor plate, and a first isolation part is arranged between any two sensor groups connected.

Optionally, k=n, one amplifier group is arranged on each receiving amplifier plate. N amplifier groups do not have two adjacent amplifier groups arranged on the same receiving amplifier plate.

Optionally, the first isolation part is an empty groove arranged on at least one of the m receiving sensor plates, and the second isolation part is an empty groove arranged on at least one of the k receiving amplifier plates.

Optionally, the ground plane is arranged on the collecting plate.

Optionally, n power supply units are provided on the collecting plate or the k receiving amplifier plates.

Optionally, the laser receiving device further includes a plurality of first connecting members and a plurality of second connecting members. The receiving amplifier plate is connected to the receiving sensor plate via the first connecting member. The receiving amplifier plate is connected to the collecting plate via the second connecting member. The first connecting member and the second connecting member may include one of a plate-to-plate connector, a wire, or a flexible circuit plate.

Optionally, at least one the n sensor groups is arranged on an upper surface of one of the m receiving sensor plates, and at least one of the plurality of first connecting members is arranged on a lower surface of one of the m receiving sensor plates.

Optionally, the photoelectric sensing assembly and the amplifying assembly are grounded on the same ground plane via one or both of a magnetic bead and a 0-ohm resistor.

Optionally, two adjacent power supply units are isolated via a filter device. The filter device includes one or more of a low dropout voltage stabilizer, a passive filter, and the magnetic beads.

Optionally, a plurality of signal receiving channels have an equal signal transmission path length.

In a second aspect, an embodiment of this application provides a LiDAR, the LiDAR including any of the foregoing laser receiving devices.

In a third aspect, this application provides a laser receiving device, including:

an photoelectric sensing assembly, including a receiving sensor plate and at least one sensor group, wherein the sensor group is arranged on and electrically connected to the receiving sensor plate;

an amplifying assembly, including a receiving amplifier plate and at least one amplifier group, wherein the amplifier group is arranged on and electrically connected to the receiving amplifier plate;

a flexible connecting member, connected between and electrically connected to the receiving sensor plate and the receiving amplifier plate, wherein the flexible connecting member and at least one of the receiving sensor plate and the receiving amplifier plate form a rigid-flex plate.

Optionally, the flexible connecting member and the receiving sensor plate form a rigid-flex plate. The flexible connecting member is provided with an edge connector, the receiving amplifier plate is provided with a connector, the connector is provided with an electrical interface, and the edge connector is inserted into the electrical interface. Thus, electrical connection between the flexible connecting member and the receiving amplifier plate is implemented.

Optionally, the flexible connecting member and the receiving amplifier plate form a rigid-flex plate. The flexible connecting member is provided with an edge connector, the receiving sensor plate is provided with a connector, the connector is provided with an electrical interface, and the edge connector is inserted into the electrical interface. Thus, electrical connection between the flexible connecting member and the receiving sensor plate is implemented.

Optionally, if the receiving sensor plate is provided with the connector and the receiving sensor plate has a first plate surface and a second plate surface opposite thereto, the sensor group is provided on the first plate surface, and the connector is provided on the second plate surface.

Optionally, if the receiving amplifier plate is provided with the connector and the receiving amplifier plate has a first plate surface and a second plate surface opposite thereto, the amplifier group is provided on the first plate surface, and the connector is provided on the second plate surface.

Optionally, the photoelectric sensing assembly includes m receiving sensor plates and n sensor groups, wherein the n sensor groups are arranged on the m receiving sensor plates, and wherein when two adjacent sensor groups are arranged on the same receiving sensor plate, a first isolation part for electromagnetic shielding is arranged between the two adjacent sensor groups, where m is an integer greater than zero, n is an integer greater than 1, and where m≤n; and the amplifying assembly includes k receiving amplifier plates and n amplifier groups, wherein the n amplifier groups are provided on the k receiving amplifier plates, wherein when two adjacent amplifier groups are arranged on the same receiving amplifier plate, the second isolation part for electromagnetic shielding is arranged between the two adjacent amplifier groups, and wherein the n amplifier groups and n sensor groups are electrically connected in a one-to-one manner, where k is an integer greater than or equal to 1, and k≤n.

Optionally, m=1, the n sensor groups are arranged on the same receiving sensor plate, and the first isolation part is provided between any two adjacent sensor groups.

Optionally, n=k, each receiving amplifier plate is provided with one amplifier group, and each receiving amplifier plate is electrically connected to the receiving sensor plate through a flexible connecting member.

Optionally, n=k=4, each sensor group includes 32 sensors.

Optionally, the 32 sensors in each sensor group are divided into two sensor units, each sensor unit includes 16 sensors, the 16 sensors in each sensor unit are connected in series, and two sensor units in each sensor group are connected in parallel and electronically connected to the amplifier group in a one-to-one manner.

Optionally, the laser receiving device further includes a collecting assembly, which includes a collecting unit electrically connected to the amplifier group, wherein the collecting unit is arranged on the receiving amplifier plate.

Optionally, the laser receiving device further includes a power supply unit, configured to supply power to the photoelectric sensing assembly and the amplifying assembly, and the power supply unit is arranged on the receiving amplifier plate.

Optionally, the laser receiving device further includes a diaphragm, located on a same side as the sensor group of the photoelectric sensing assembly.

Optionally, the laser receiving device further includes a mounting bracket, which includes a first connecting portion and a second connecting portion spaced apart, wherein the receiving sensor plate, the receiving amplifier plate, and the diaphragm are all connected between the first connecting portion and the second connecting portion.

Optionally, the diaphragm and the first connecting portion are integrated, and a connection between the diaphragm and the second connecting portion is a detachable connection.

Optionally, the receiving sensor plate is sandwiched between the first connecting portion and the second connecting portion, a first positioning member is provided on the receiving sensor plate, and the diaphragm is provided with a second positioning member matching the first positioning member.

Optionally, the receiving amplifier plate is connected to the first connecting portion and/or the second connecting portion via a locking member.

In a fourth aspect, an embodiment of this application provides a LiDAR, the LiDAR including the laser receiving device according to the third aspect.

This application discloses a laser receiving device, including a photoelectric sensing assembly, an amplifying assembly, a collecting assembly, and n power supply units. The photoelectric sensing assembly includes at least one receiving sensor plate and a plurality of sensor groups. At least one sensor group is arranged on each receiving sensor plate. When two adjacent sensor groups are arranged on the same receiving sensor plate, a first isolation part for electromagnetic shielding is arranged between the two adjacent sensor groups. The amplifying assembly includes at least one receiving amplifier plate and a plurality of amplifier groups. At least one amplifier group is arranged on each receiving amplifier plate. The second isolation part for electromagnetic shielding is arranged between two adjacent amplifier groups on the same receiving amplifier plate. The collecting assembly includes a collecting plate and a plurality of collecting units arranged on the collecting plate. The n power supply units supply power to the photoelectric sensing assembly and the amplifying assembly, respectively. The photoelectric sensing assembly and the amplifying assembly are grounded through the same ground plane. The laser receiving device includes n signal receiving channels. Each signal receiving channel includes one sensor group, one amplifier group, one collecting unit, and one power supply unit. In this application, isolation components are arranged among a plurality of parallel sensor groups. The plurality of amplifier groups are arranged on different circuit plates, respectively, so that the plurality of parallel receiving channels in the LiDAR form independent current loops, thereby reducing noise crosstalk between the signal receiving channels and improving the signal-of-noise ratio of the laser receiving device.

In addition, further, based on the laser receiving device and the LiDAR in this application, the receiving sensor plate and the receiving amplifier plate are electrically connected through the flexible connecting member. Because the flexible connecting member is deformable, after the receiving sensor plate and the receiving amplifier plate are connected through the flexible connecting member, relative positions of the receiving sensor plate and the receiving amplifier plate can still flexibly change. Compared with a case in which the rigid receiving sensor plate and the rigid receiving amplifier plate are connected through a rigid plate-to-plate connector, the overall layout space of the laser receiving device can be optimized to implement a miniaturized design of the LiDAR. The flexible connecting member and the receiving sensor plate and/or the receiving amplifier plate form the rigid-flex plate, to reduce assembly steps. In addition, connection strength of the soft plate and the hard plate in the rigid-flex plate is greater than that of an electrical connection manner such as spot welding, which can greatly increase structural strength of the laser receiving device.

BRIEF DESCRIPTION OF DRAWINGS

In order to explain embodiments of the present disclosure or the technical solutions in the prior art more clearly, the following briefly introduces the drawings that need to be used in the embodiments. Obviously, the drawings in the following description are only some of the embodiments of the present disclosure. A person skilled in the art can obtain other drawings based on these drawings without creative work.

DETAILED DESCRIPTION

The following embodiments of the present disclosure provide a laser receiving device and LiDAR. An isolation part is provided between a plurality of parallel sensor groups, and a plurality of amplifier groups are arranged on different circuit plates, respectively, so that the plurality of parallel receiving channels each form an independent current loop, thereby reducing noise crosstalk among signal receiving channels and improving the signal-to-noise ratio of the laser receiving device.

The following clearly and completely describes the technical solutions in the embodiments of the present disclosure in conjunction with the drawings in the embodiments of the present disclosure. Obviously, the described embodiments are only a part of the embodiments of the present disclosure, rather than all embodiments. Based on the embodiments of the present disclosure, all other embodiments obtained by a person skilled in the art without creative labor shall fall within the protection scope of the present disclosure.

Figure 1:
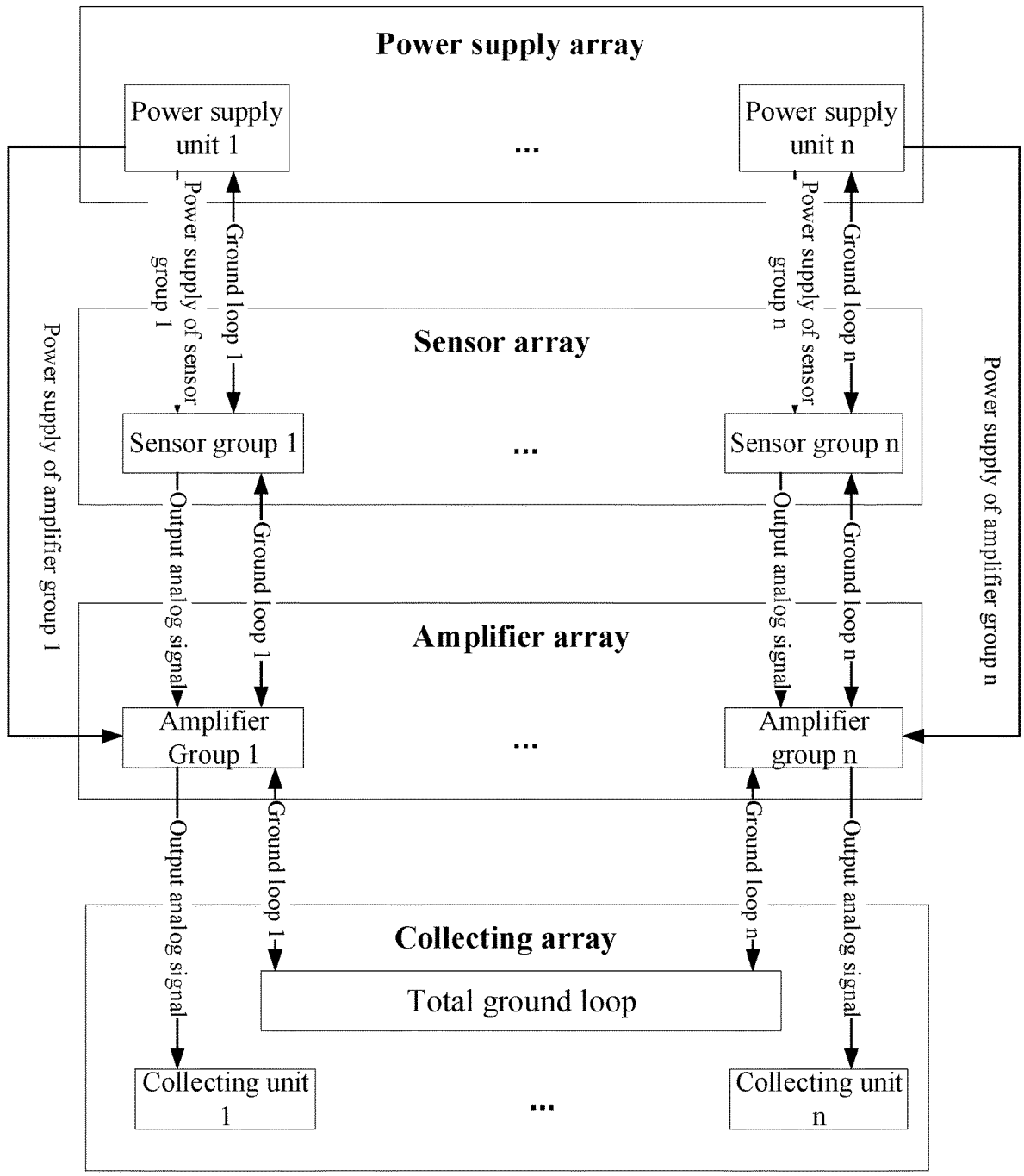
FIG. 1 shows a schematic diagram of a laser receiving device in the prior art.

FIG. 1 shows a schematic diagram of a laser receiving device in the prior art. The laser receiving device is arranged in a multi-line parallel LiDAR. The laser receiving device includes:

a power supply array, including n power supply units for supplying power to each sensor in a sensor array and each amplifier in an amplifier array, where n is an integer greater than 1. The power supply array can be a switch unit and have n output ports. N output ports can output voltage in n channels.

the sensor array, including n sensor groups, where n sensor groups and n power supply units are connected in a one-to-one manner for receiving echo laser signals, converting the echo laser signals into electrical signals, and outputting the electrical signals to the amplifier array. The sensors can be photodiodes.

the amplifier array, including n amplifier groups, where n amplifier groups and n sensor groups are connected in a one-to-one manner for amplifying and shaping the electrical signals output by the sensor groups. The amplifiers can be operational amplifiers.

a collecting array, including n collecting units, where n collecting units and n amplifier groups are connected in a one-to-one manner for collecting the electrical signals output by the amplifier array. The collecting units can be analog-to-digital conversion units and/or time-to-digital converters.

The LiDAR includes n signal receiving channels in parallel. Each signal receiving channel corresponds to one amplifier group, one sensor group, one collecting unit, and one power supply unit. The power supply array, the sensor array, the amplifier array, and the collecting array operate serially in groups and are parallel among groups. For example, the sensor group 1 includes a sensor 1-1 and a sensor 1-2. The sensor group 2 includes a sensor 2-1 and a sensor 2-2. The sensor 1-1 and the sensor 1-2 operate serially. The sensor 1-1 and the sensor 2-1 operate in parallel.

Based on the above working manners, the sensors and the amplifiers in the group share the power supply unit, the collecting unit, and the ground, while separate power supply units and separate collecting units are used among the groups. Therefore, the laser receiving device includes a total of n power supply units and n collecting units. The power supply array, the sensor array, and the amplifier array are finally grounded on the collecting array to form a closed current loop corresponding to each signal receiving channel.

In the prior art, a multi-line LiDAR usually has more than two sensor groups in parallel. However, as the volume of the LiDAR decreases, the sensors in the sensor array are densely distributed, and the isolation between the receiving channels decreases. In addition, since the distance between the sensors is too small, the amplifier cannot be arranged nearby, and the signals need to travel a long transmission path to reach the input terminal of the amplifier, so that coupling noise and electrical crosstalk signals exist between the receiving channels in parallel on the transmission path, thereby greatly reducing the signal-to-noise ratio and detection accuracy of the laser receiving device.

Figure 2:
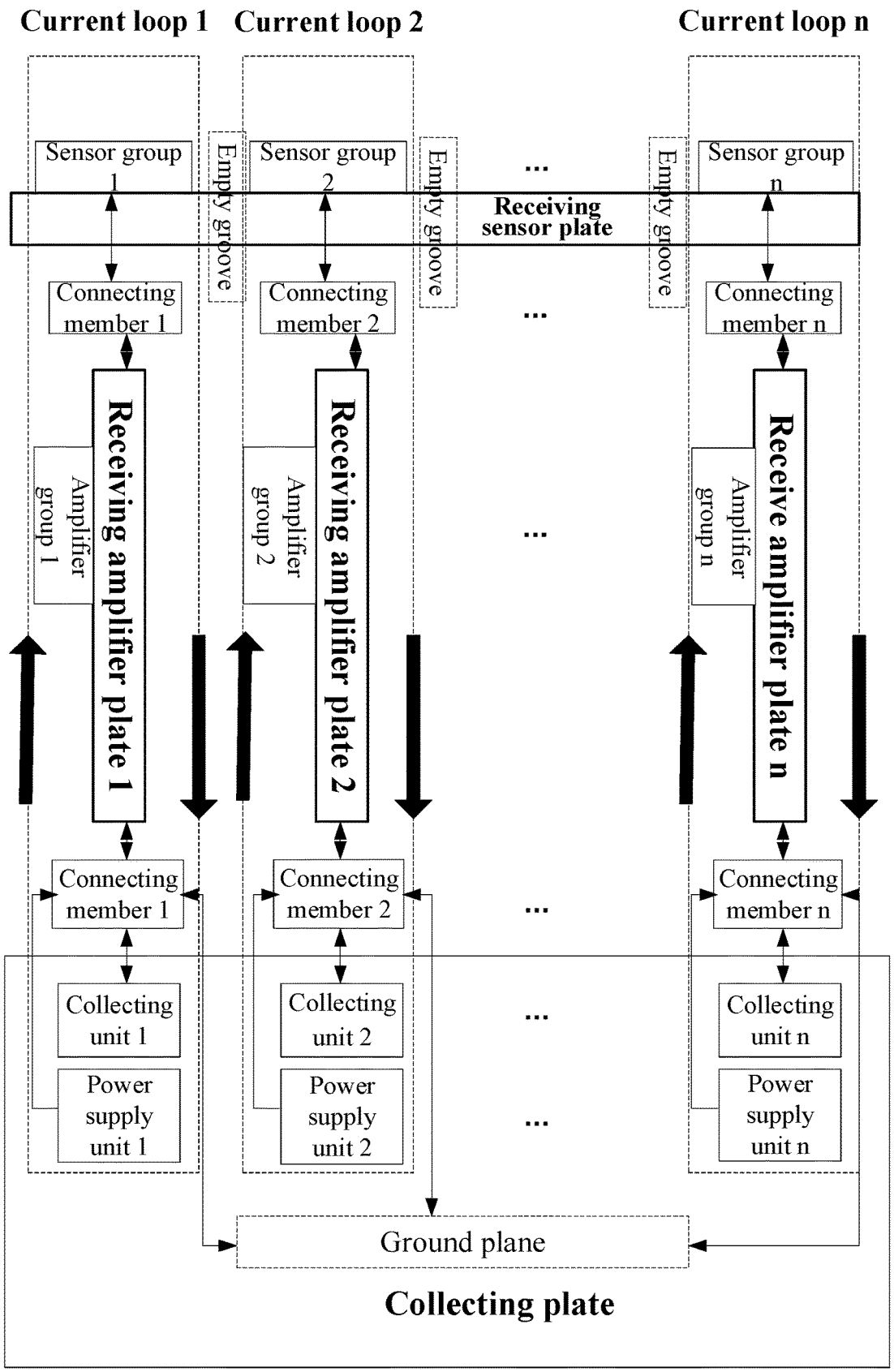
FIG. 2 shows a schematic diagram of a laser receiving device according to an embodiment of the present disclosure.

In order to solve the problem of the low signal-to-noise ratio caused by the crosstalk among the signal receiving channels in the laser receiving device in the prior art, this application provides a laser receiving device. As shown in FIG. 2, the laser receiving device of the present application includes a photoelectric sensing assembly, an amplification assembly, a collecting assembly, and n power supply units.

The photoelectric sensing assembly includes m receiving sensor plates and n sensor groups. N sensor groups are arranged on the m receiving sensor plates. When two adjacent sensor groups are arranged on the same receiving sensor plate, a first isolation part for electromagnetic shielding is arranged between two adjacent receiving sensor groups. m is an integer greater than zero, and n is an integer greater than 1, where m≤n. Since the number of the receiving sensor plates is less than or equal to the number of the sensor groups, at least one sensor group is arranged on one receiving sensor plate. When a plurality of sensor groups are arranged on one receiving sensor plate, the first isolation part for electromagnetic shielding is arranged between two adjacent sensor groups on the same sensor plate, thereby preventing crosstalk generated by two adjacent sensor groups via a metal line on the receiving sensor plate. If two adjacent sensor groups are arranged on different receiving sensor plates, since a certain spacing is provided between the receiving sensor plates and the possibility of crosstalk generated between two adjacent sensor groups is low, the isolation part does not need to be arranged. The receiving sensor plate can be a printed circuit board for carrying one or more sensor groups.

For example, the photoelectric sensing assembly includes two receiving sensor plates and three sensor groups. The two receiving sensor plates are receiving sensor plate 1 and receiving sensor plate 2. The three sensor groups are sensor group 1, sensor group 2, and sensor group 3. The sensor group 1 is arranged on the receiving sensor plate 1. The sensor group 2 and the sensor group 3 are both arranged on the receiving sensor plate 2. An empty groove for electromagnetic shielding is arranged between the sensor group 2 and the sensor group 3.

In another example, the photoelectric sensing assembly includes one receiving sensor plate and three sensor groups. The three sensor groups are sensor group 1, sensor group 2, and sensor group 3. The sensor group 1, the sensor group 2, and the sensor group 3 are all arranged on the same receiving sensor plate. Therefore, a first isolation part is arranged between the sensor group 1 and the sensor group 2. Another first isolation part is arranged between the sensor group 2 and the sensor group 3.

In another example, the photoelectric sensing assembly includes two receiving sensor plates and two sensor groups. The two receiving sensor plates are receiving sensor plate 1 and receiving sensor plate 2. The two sensor groups are sensor group 1 and sensor group 2. The sensor group 1 is arranged on the receiving sensor plate 1. The sensor group 2 is arranged on the receiving sensor plate 2. Since the sensor group 1 and the sensor group 2 are arranged on different receiving sensor plates, a first shielding part may not be provided between the sensor group 1 and the sensor group 2.

The amplifying assembly includes k receiving amplifier plates and n amplifier groups. N amplifier groups are arranged on the k receiving amplifier plates. When two adjacent amplifier groups are arranged on the same receiving amplifier plate, a second isolation part for electromagnetic shielding is provided between two adjacent amplifier groups. N amplifier groups and n sensor groups are connected in a one-to-one manner. k is an integer greater than or equal to 1, and k≤n. Since the number of the receiving amplifier plates is less than the number of the amplifier groups, when n amplifier groups are arranged on the k receiving amplifier plates, at least one amplifier group is arranged on one receiving amplifier plate. When the plurality of amplifier groups are arranged on one receiving amplifier plate, the second isolation part for electromagnetic shielding is provided between two adjacent amplifier groups on the same receiving amplifier plate, thereby preventing crosstalk generated between two adjacent amplifier groups via the metal line on the receiving amplifier plate. When two adjacent amplifier groups are arranged on different receiving amplifier plates, since a certain spacing is provided between different receiving amplifier plates, and the possibility of crosstalk generated between two adjacent amplifier groups is low, a second shielding part may not be provided between two adjacent amplifier groups. The receiving amplifier plate can be a printed circuit board for carrying one or more amplifier groups. N amplifier groups and n sensor groups are connected in a one-to-one manner.

The collecting assembly includes a collecting plate and n collecting units. N collecting units are arranged on the collecting plate. N collecting units and n amplifier groups are connected in a one-to-one manner. The collecting assembly is configured to collect electrical signals output by the amplifying assembly. N collecting units collect parallel signals on n signal receiving channels. For example, the collecting unit includes an analog-to-digital converter and/or a time-to-digital converter.

N power supply units are configured to supply power to the photoelectric sensing assembly and the amplifying assembly. N power supply units and n amplifier groups are connected in a one-to-one manner. N power supply units and n sensor groups are connected in a one-to-one manner. Each sensor in the photoelectric sensing assembly and each amplifier group in the amplifying assembly converge to the same ground plane for grounding.

In one or more possible embodiments, m=1, n sensor groups are arranged on the same receiving sensor plate. A first isolation part is arranged between any two adjacent sensor groups.

For example, as shown in FIG. 2, the sensor groups 1 through n are all arranged on the same receiving sensor plate. The first isolation part is an empty groove. The empty groove is provided between the sensor group 1 and the sensor group 2, the empty groove is arranged between the sensor group 2 and the sensor group 3, . . . and the empty groove is arranged between the sensor group n−1 and the sensor group n. The empty groove is a hollowed-out region on the receiving sensor plate. No wiring and copper are allowed in the hollowed-out region. An opening of a certain length and depth can also be milled in the hollowed-out region, thereby realizing spatial isolation between two adjacent sensor groups with respect to the wiring and the ground, and confining a current loop of each sensor group within the group.

In one or more possible embodiments, k=n, and one amplifier group is arranged on each receiving amplifier plate.

For example, as shown in FIG. 2, each amplifier group is arranged on different receiving amplifier plates. The amplifier group 1 is arranged on the receiving amplifier plate 1, the amplifier group 2 is arranged on the receiving amplifier plate 2, . . . and the amplifier group n is arranged on the receiving amplifier plate n. The second isolation part may not be provided between two adjacent amplifier groups. Isolation is realized depending on the distance between the receiving amplifier plates.

In one or more possible embodiments, the ground plane is arranged on the collecting plate.

For example, as shown in FIG. 2, each sensor group in the photoelectric sensing assembly and each amplifier group in the amplifier assembly are all converged to the ground plane of the collecting plate for grounding.

In one or more possible embodiments, n power supply units are arranged on the collecting plate or the k receiving amplifier plates.

For example, as shown in FIG. 2, n power supply units are arranged on the collecting plate to supply power to each amplifier group and each sensor group respectively, that is, the power supply unit 1 supplies power to the amplifier group 1 and the sensor group 1, the power supply unit 2 supplies power to the amplifier group 1 and the sensor group 2, . . . and the power supply unit n supplies power to the amplifier group n and the sensor group n.

When n power supply units are provided on the k receiving amplifier plates, since k≤n, one or more power supply units are provided on one receiving amplifier plate.

Further, two adjacent power supply units are isolated by a filter device. The filter device includes one or more of a low dropout linear voltage stabilizer, a passive filter, and the magnetic beads, thereby reducing the crosstalk between the power supply units.

In one or more possible embodiments, the laser receiving device further includes a plurality of first connecting members and a plurality of second connecting members. The receiving amplifier plate is connected to the receiving sensor plate via the first connecting member. The receiving amplifier plate is connected to the collecting plate via the second connecting member. The first connecting member and the second connecting member are a plate-to-plate connector, a wire, or a flexible printed circuit (FPC).

For example, as shown in FIG. 2, one end of the receiving amplifier plate is connected to the receiving sensor plate via the connecting member, and the other end thereof is also electrically connected to the collecting plate. As a result, the sensor group on the receiving sensor plate is electrically connected to the amplifier group on the receiving amplifier plate, and the amplifier group on the receiving amplifier plate is electrically connected to the collecting unit on the collecting plate.

Further, the sensor group is arranged on the upper surface of the receiving sensor plate, and the first connecting member is arranged on the lower surface of the receiving sensor plate.

The sensor group is arranged on the upper surface of the receiving sensor plate. The first connecting member is arranged on the lower surface of the receiving sensor plate. The first connecting member can be a connector or a flexible wire, so that the sensor group can quickly transmit electrical signals to the receiving amplifier plate via a shorter transmission path while also supplying power and a return path to the sensor in the group via the first connecting member.

In one or more embodiments, the signal transmission path length of each signal receiving channel is equal. For example, the signal receiving channel includes the sensor group, the amplifier group, the collecting unit, and the power supply unit. The signal transmission path length is the length of the signals passing through the sensor group and the amplifier group to the collecting unit, thereby keeping consistency of each signal receiving channel and improving synchronization performance.

Figure 3:
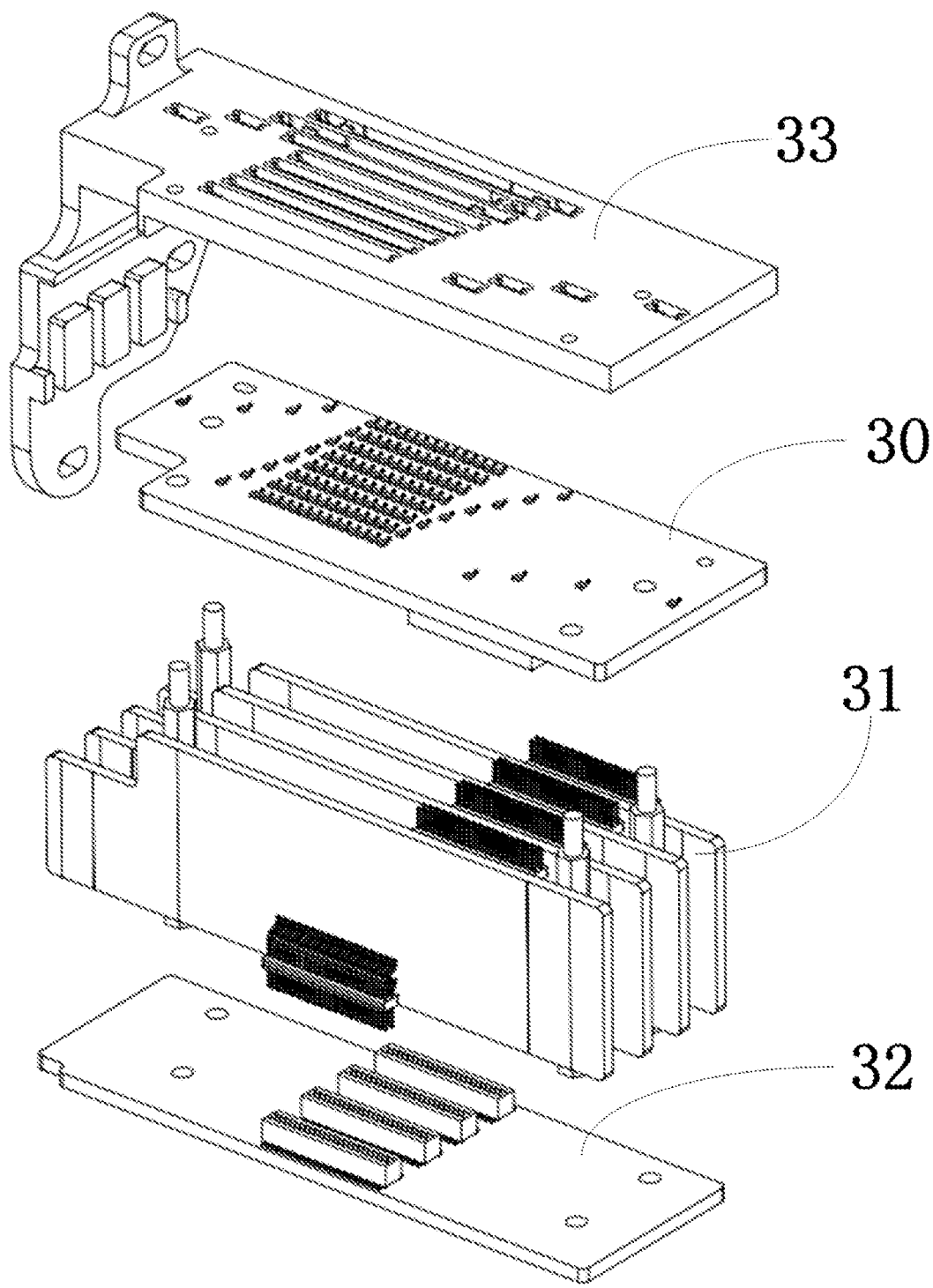
FIG. 3 shows a schematic diagram of a 3D structure of a laser receiving device according to an embodiment of the present disclosure.

FIG. 3 shows a schematic diagram of a 3D structure of a laser receiving device according to the embodiment of this application. In FIG. 3, m=1, and k=n, that is, in the laser receiving device, the photoelectric sensing assembly includes one receiving sensor plate 30 and n sensor groups. N sensor groups are all arranged on the same receiving sensor plate 30. The empty groove for electromagnetic shielding is arranged between two adjacent sensor groups. The amplifying assembly includes n amplifier groups and n receiving amplifier plates 31. N amplifier groups correspond to n amplifier plates 31 one by one. That is, only one amplifier group is arranged on each receiving amplifier plate 31. N amplifier plates 31 are inserted into the receiving sensor plate 30 in a blade manner. The laser receiving device further includes the collecting plate 32 and a diaphragm 33. Echo laser signals pass through the diaphragm 33. The diaphragm 33 is configured to reduce the problem of optical crosstalk when the laser receiving device receives laser signals. In FIG. 3, the empty groove for electromagnetic shielding is arranged between every two of n sensor groups on the same receiving sensor plate. N amplifier groups are arranged on the different amplifier plates, respectively, providing a better isolation effect and hence reducing the crosstalk between the amplifier groups to a greater extent. In addition, the space inside the laser receiving device can be optimized, and the heat dissipation performance of each amplifier in the amplifier group can be improved.

During the use of the laser receiving device disclosed in the embodiments of the present disclosure, n power supply units supply power to n amplifier groups in the amplifying assembly and n sensor groups in the photoelectric sensing assembly, respectively. The sensor group includes a plurality of sensors. Only one sensor operates at a time. The sensor is configured to convert the echo laser signals into electrical signals. The sensor can be a photodiode. The amplifier group includes a plurality of amplifiers. The amplifier is configured to amplify and rectify the electrical signals output by the sensor. The collecting unit is configured to rectify the electrical signals output by the amplifier. The laser receiving device of this application includes n signal receiving channels. N signal receiving channels each include one sensor group, one amplifier group, one collecting unit, and one power supply unit, respectively. According to the structure of the laser receiving device in the embodiments of this application, each signal receiving channel forms an independent current loop, for example, as shown in FIG. 2, a circuit loop 1, a current loop 2, . . . and a current loop 3, which can reduce noise crosstalk between the signal receiving channels and improve the signal-to-noise ratio of the laser receiving device.

The embodiments of this application have the following beneficial effects.

The crosstalk noise is optimized. The sensors and the amplifiers in each group are independent from those in other groups regarding power supply and current loop, thereby effectively reducing crosstalk noise coupled to a path from the sensor to the amplifier, avoiding mutual disturbance among amplifiers operating in parallel via the reference plane, effectively improving stability of the amplifier, enhancing the signal-to-noise ratio of the laser receiving device, and improving accuracy of laser measurement.

Consistency is optimized. After grouping, a sensor layout and an amplifier plate layout are consistent between the groups. The signal transmission path length from the sensor and the amplifier to the collecting unit is equal, thereby realizing consistency in the reception performance of all signal receiving channels.

The amplifier input path is optimized. In the architecture of a miniaturized, compact and dense layout of the sensors in the prior art, the amplifier cannot be arranged next to the sensor. In this application, the connecting member is directly arranged on the lower surface of the receiving sensor plate and below the sensor, so that the sensor quickly inputs signals to an input terminal of the amplifier via a shorter transmission distance, thereby greatly reducing distributed capacitance and inductance coupled to the path, and improving bandwidth and stability of the operation of the amplifier.

Heat dissipation performance is optimized. The sensor has a temperature-sensitive feature. The amplifier is the main heat source in the laser receiving device. To reduce impact of the heating of the amplifier on the performance of the sensor, only one amplifier operates in each amplifier group in the embodiments of this application, so that the receiving amplifier plate has a uniform distribution of the heat source, thereby being conducive to the heat dissipation of a plate card, reducing the overall temperature of the laser receiving device, reducing the temperature difference between different positions in a receiving cavity, and improving the performance consistency of devices distributed in each position.

Modular design is optimized. Each group has high consistency. Only the number of groups or the number of inter-groups are adjusted, and thus the device can be quickly conveyed to different product lines, with high reusability, low development and modification difficulty and cost, thereby greatly shortening the time and costs of new product development. The types of plate cards are reduced in a mass-produced product, thereby facilitating management, and shortening cost and time to repair malfunctions of a receiving hardware.

Figure 4:
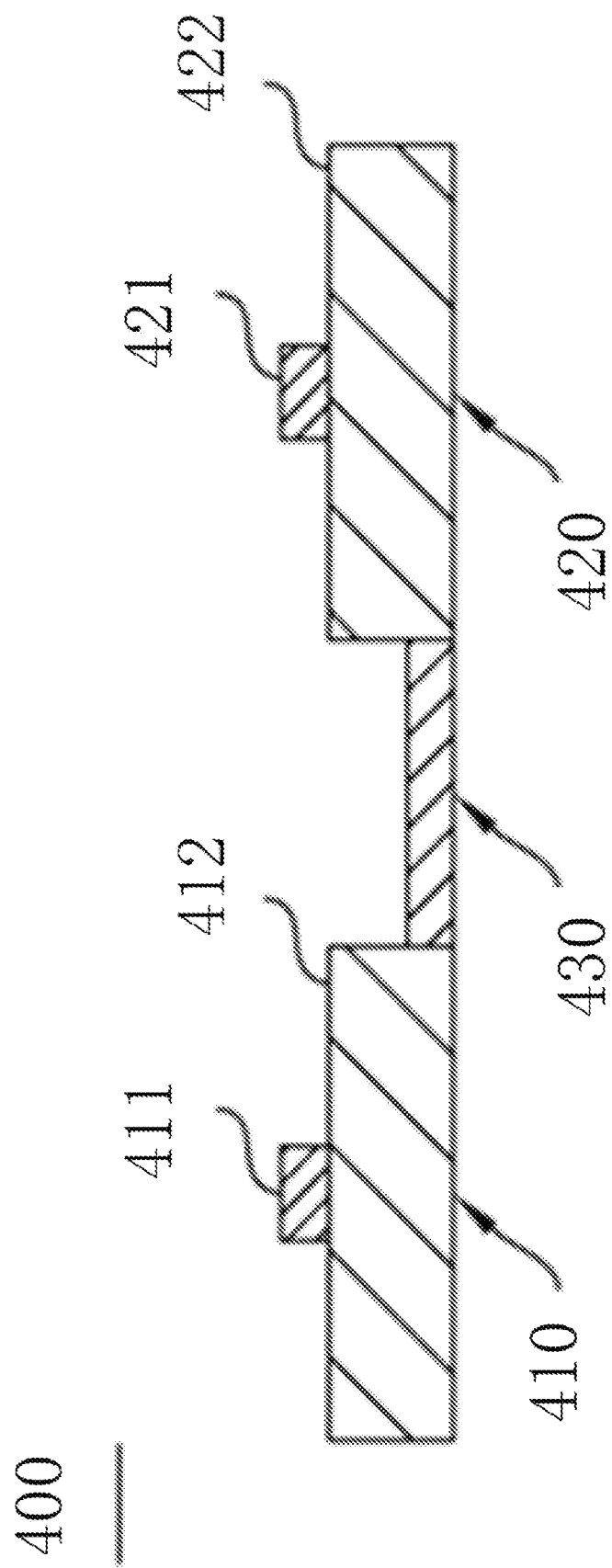
FIG. 4 is a cutaway view of a first laser receiving device according to an embodiment of the present application.

Referring to FIG. 4, an embodiment of this application provides a laser receiving device 400. The laser receiving device 400 may be provided in a LiDAR to receive a laser signal reflected by a probed object. Specifically, the laser receiving device 400 may include a photoelectric sensing assembly 410 and an amplifying assembly 420.

The photoelectric sensing assembly 410 may include at least one sensor group 411. The sensor group 411 may include at least one sensor, and the sensor may be configured to receive an echo laser signal, convert the echo laser signal into an electrical signal, and output the electrical signal to the amplifying assembly 420. The sensor can be a photodiode or the like. The photoelectric sensing assembly 410 may also include a receiving sensor plate 412 electrically connected to the sensor group 411. The receiving sensor plate 412 may be configured to hold the sensor group 411 and provide a control signal, a power supply signal, and the like for the sensor group 411.

The amplifying assembly 420 may include at least one amplifier group 421. The amplifier group 421 may include at least one amplifier, and the amplifier may be configured to amplify and shape the electrical signal output by the sensor; and the amplifier may be an operational amplifier or the like. The amplifying assembly 420 may further include a receiving amplifier plate 422 electrically connected to the amplifier group 421. The receiving amplifier plate 422 may be configured to hold the amplifier group 421 and provide a control signal, a power supply signal, and the like for the amplifier group 421.

The receiving sensor plate 412 can be electrically connected to the receiving amplifier plate 422 to further implement the electrical connection between the sensor group 411 on the receiving sensor plate 412 and the amplifier group 421 on the receiving amplifier plate 422, thereby implementing signal exchange between the sensor group 411 and the amplifier group 421.

The receiving sensor plate 412 and the receiving amplifier plate 422 may be electrically connected through a flexible connecting member 430. The flexible connecting member 430 is a deformable part. Because the flexible connecting member 430 is deformable, after the receiving sensor plate 412 and the receiving amplifier plate 422 are connected through the flexible connecting member 430, relative positions of the receiving sensor plate 412 and the receiving amplifier plate 422 can still flexibly change. Compared with the foregoing embodiment in which the rigid receiving sensor plate 412 and the rigid receiving amplifier plate 422 are connected through a rigid plate-to-plate connector, the overall layout space of the laser receiving device 400 can be optimized to implement a miniaturized design of LiDAR.

Optionally, the flexible connecting member 430 and the receiving sensor plate 412 and/or the receiving amplifier plate 422 can form a rigid-flex plate. Herein, "and/or" describes only an association relationship for associated objects and indicates that three relationships may exist, for example, A and/or B may indicate the following three cases—only A exists, both A and B exist, and only B exists. In this way, the case in which the flexible connecting member 430 and the receiving sensor plate 412 and/or the receiving amplifier plate 422 form the rigid-flex plate may be one of three cases—the flexible connecting member 430 and the receiving sensor plate 412 form the rigid-flex plate; the flexible connecting member 430 and the receiving amplifier plate 422 form the rigid-flex plate; and the flexible connecting member 430, the receiving sensor plate 412, and the receiving amplifier plate 422 form the rigid-flex plate.

The rigid-flex plate is a combination of a soft plate and a hard plate, and is a circuit board formed by combining a thin flexible bottom layer and a rigid bottom layer, and then laminating them into a single component. The foregoing flexible connecting member 430 can be viewed as a soft plate in the rigid-flex plate, and the receiving sensor plate 412 and the receiving amplifier plate 422 can be viewed as the hard plate in the rigid-flex plate. The flexible connecting member 430 and the receiving sensor plate 412 and/or the receiving amplifier plate 422 form the rigid-flex plate, to reduce assembly steps. In addition, connection strength of the soft plate and the hard plate in the rigid-flex plate is greater than that of an electrical connection manner such as spot welding, which can greatly increase structural strength of the laser receiving device 400.

When the flexible connecting member 430, the receiving sensor plate 412, and the receiving amplifier plate 422 form the rigid-flex plate, wires on the flexible connecting member 430 can be directly electrically connected to the wires on the receiving sensor plate 412, and wires on the flexible connecting member 430 can be directly electrically connected to the wires on the receiving amplifier plate 422, without an electrical connection operation such as spot welding, to reduce assembly steps of the flexible connecting member 430 and the receiving sensor plate 412, and assembly steps of the flexible connecting member 430 and the receiving amplifier plate 422.

Figure 5:
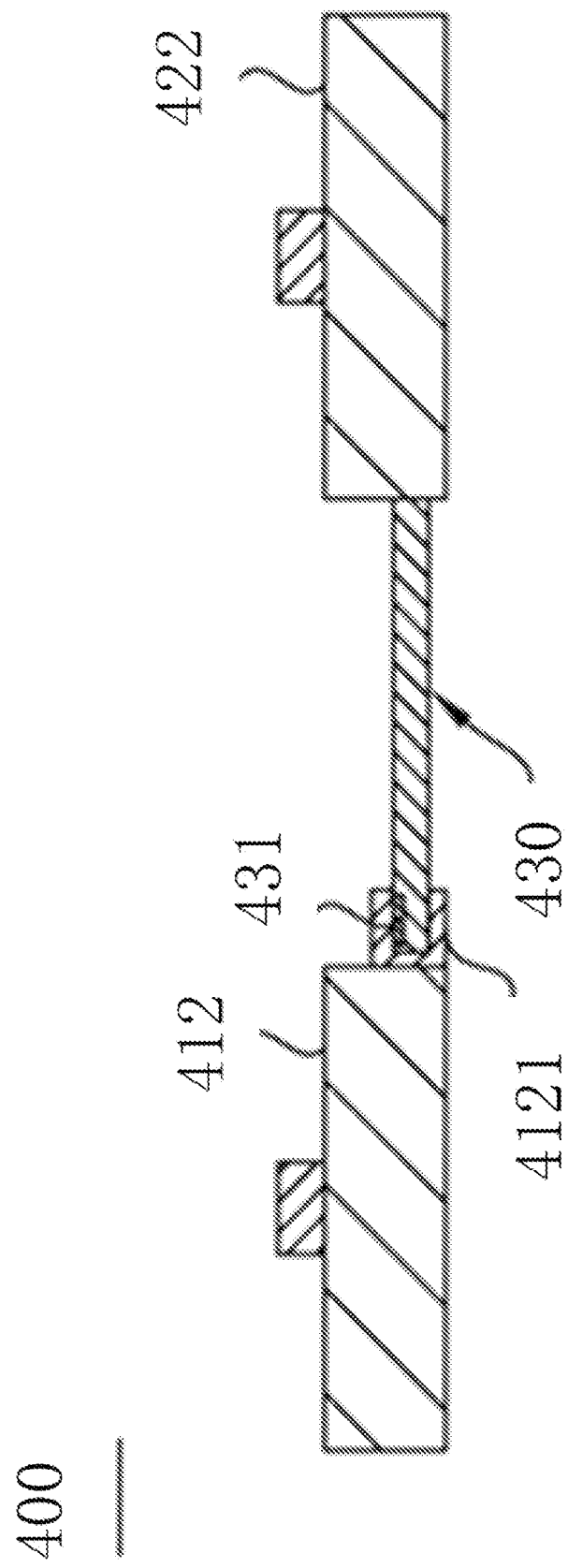
FIG. 5 is a cutaway view of a second laser receiving device according to an embodiment of the present application.

When only the flexible connecting member 430 and the receiving amplifier plate 422 form the rigid-flex plate, wires on the flexible connecting member 430 can be directly electrically connected to the wires on the receiving amplifier plate 422, to implement the electrical connection between the flexible connecting member 430 and the receiving amplifier plate 422, but the electrical connection operations such as spot welding and connector and cord fixing also need to be performed on the flexible connecting member 430 and the receiving sensor plate 412. Optionally, the flexible connecting member 430 and the receiving sensor plate 412 may be electrically connected through a hot-pluggable manner, to facilitate disassembly and assembly of the flexible connecting member 430 and the receiving sensor plate 412. Specifically, referring to FIG. 5, an edge connector 431 can be provided on the flexible connecting member 430, a connector 4121 with an electrical interface can be provided on the receiving sensor plate 412, and the edge connector 431 can be inserted into the electrical interface of the connector 4121, to further implement the electrical connection between the flexible connecting member 430 and the receiving sensor plate 412.

Figure 6:
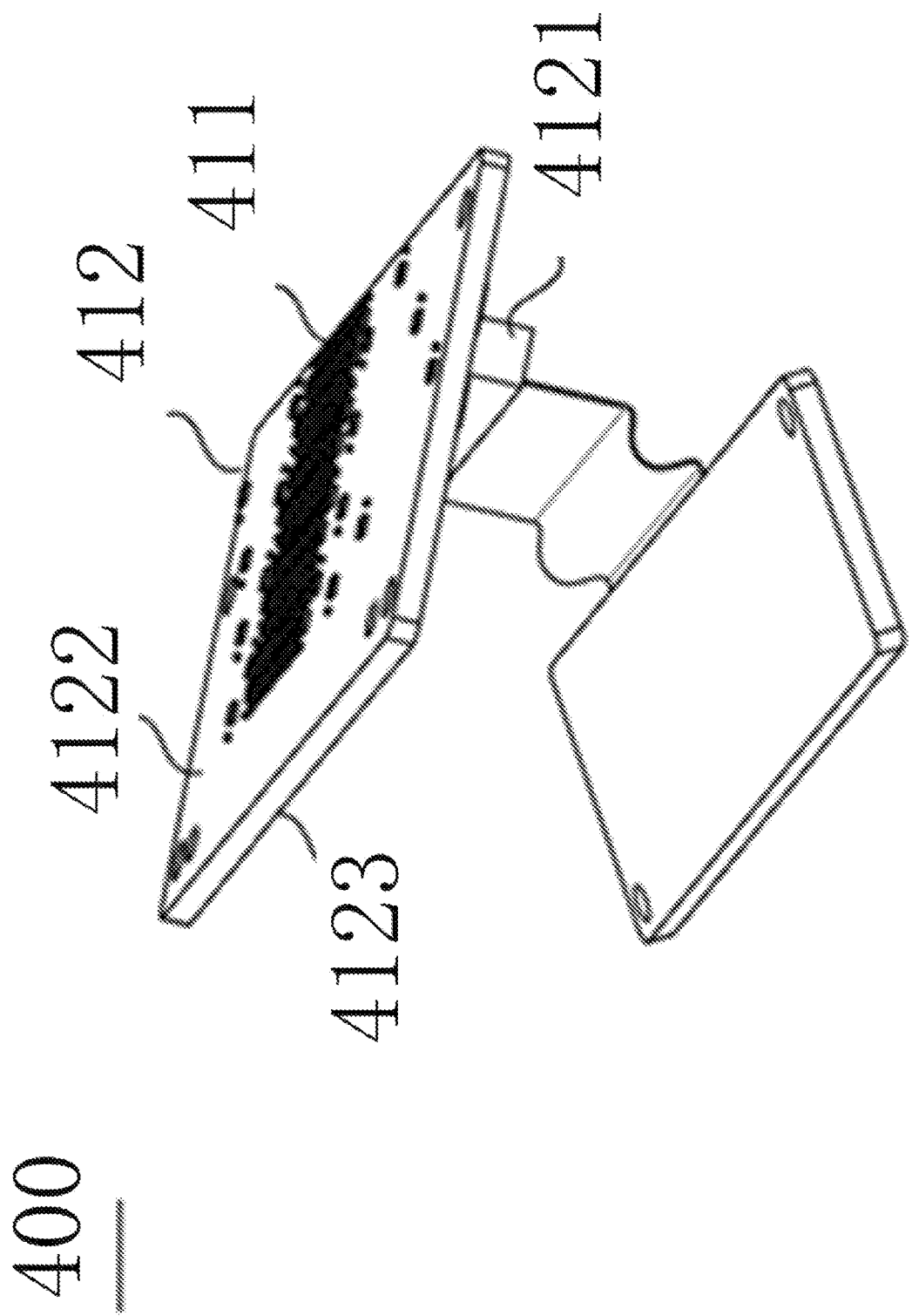
FIG. 6 is a 3D diagram of a third laser receiving device according to an embodiment of the present application.

Referring to FIG. 6, the receiving sensor plate 412 may be provided with a first plate surface 4122 and a second plate surface 4123 opposite thereto. The sensor group 411 may be located on the first plate surface 4122, and the connector 4121 may be located on the second plate surface 4123. The sensor group 411 and the connector 4121 are respectively provided on the two opposite surfaces of the receiving sensor plate 412. Compared with a case in which the sensor group 411 and the connector 4121 are provided on a same surface of the receiving sensor plate 412, a miniaturized design of the receiving sensor plate 412 can be implemented in this way.

Similarly, when only the flexible connecting member 430 and the receiving sensor plate 412 form the rigid-flex plate, wires on the flexible connecting member 430 can be directly electrically connected to the receiving sensor plate 412, and the electrical connection operations such as spot welding and connector and cord fixing also need to be performed on the flexible connecting member 430 and the receiving amplifier plate 422. Optionally, the flexible connecting member 430 and the receiving amplifier plate 422 may be electrically connected through a hot-pluggable manner, to facilitate disassembly and assembly of the flexible connecting member 430 and the receiving amplifier plate 422. Specifically, referring to FIG. 7, an edge connector 432 can be provided on the flexible connecting member 430, and a connector 4221 with an electrical interface can be provided on the receiving amplifier plate 422. The edge connector 432 can be inserted into the electrical interface of the connector 4221, to further implement the electrical connection between the flexible connecting member 430 and the receiving amplifier plate 422.

Figure 8:
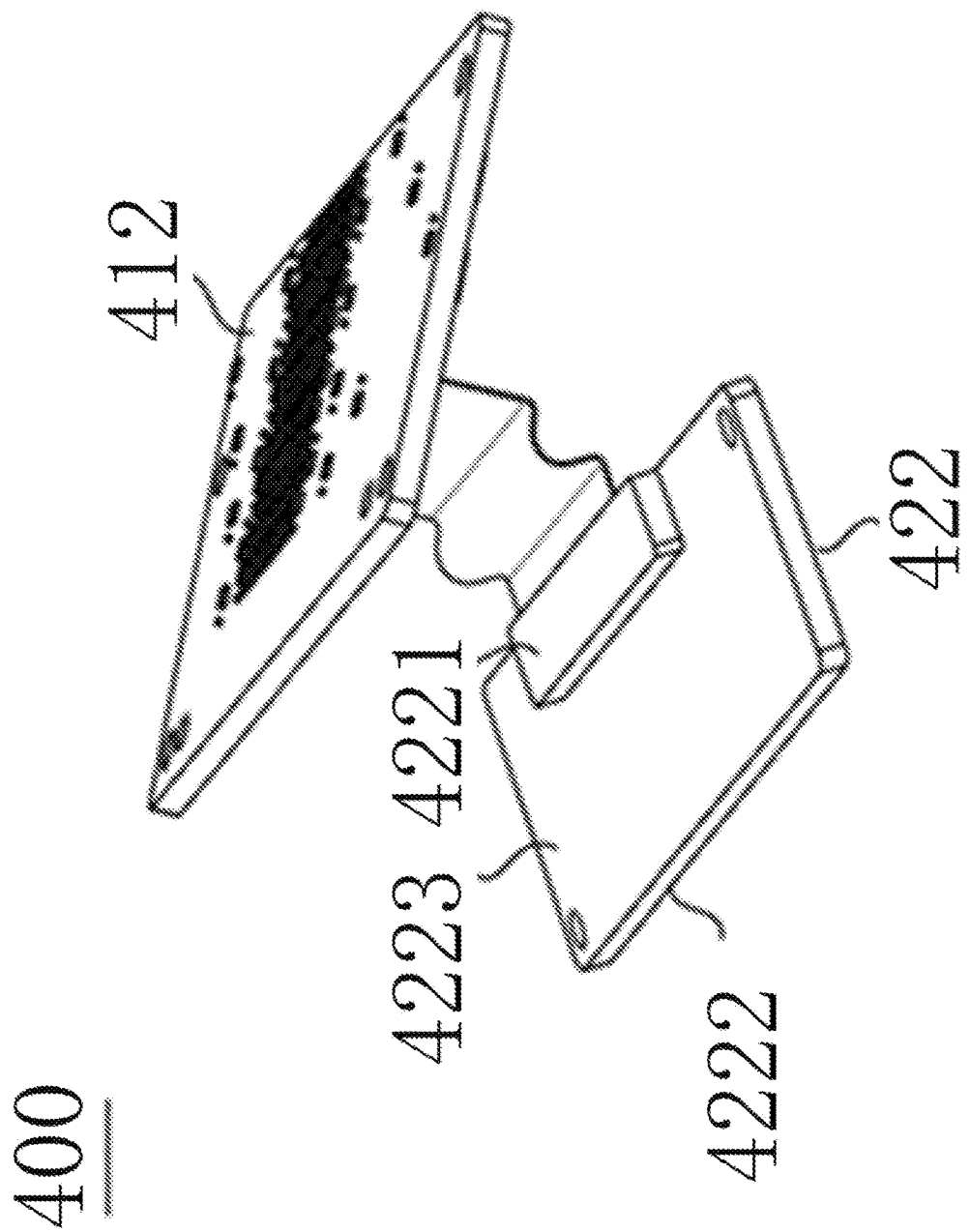
FIG. 8 is a 3D diagram of a fifth laser receiving device according to an embodiment of the present application.

Referring to FIG. 8, the receiving amplifier plate 422 may be provided with a first plate surface 4222 and a second plate surface 4223 opposite thereto. The amplifier group 421 (not shown in the figure) may be located on the first plate surface 4222, and the connector 4221 may be located on the second plate surface 4223. The amplifier group 421 and the connector 4221 are respectively provided on the two opposite surfaces of the receiving amplifier plate 422. Compared with a case in which the amplifier group 421 and the connector 4221 are provided on a same surface of the receiving amplifier plate 422, a miniaturized design of the receiving amplifier plate 422 can be implemented in this way.

The laser receiving device 400 in this application can be applied to any LiDAR. This is not limited in these embodiments of this application. Optionally, the laser receiving device 400 in this application can be used in a multi-line LiDAR. The multi-line LiDAR can transmit and receive multiple laser beams simultaneously, and has high scanning efficiency and potential broad application. The following provides a detailed description by using an example in which the laser receiving device 400 is applied to the multi-line LiDAR.

Figure 9:
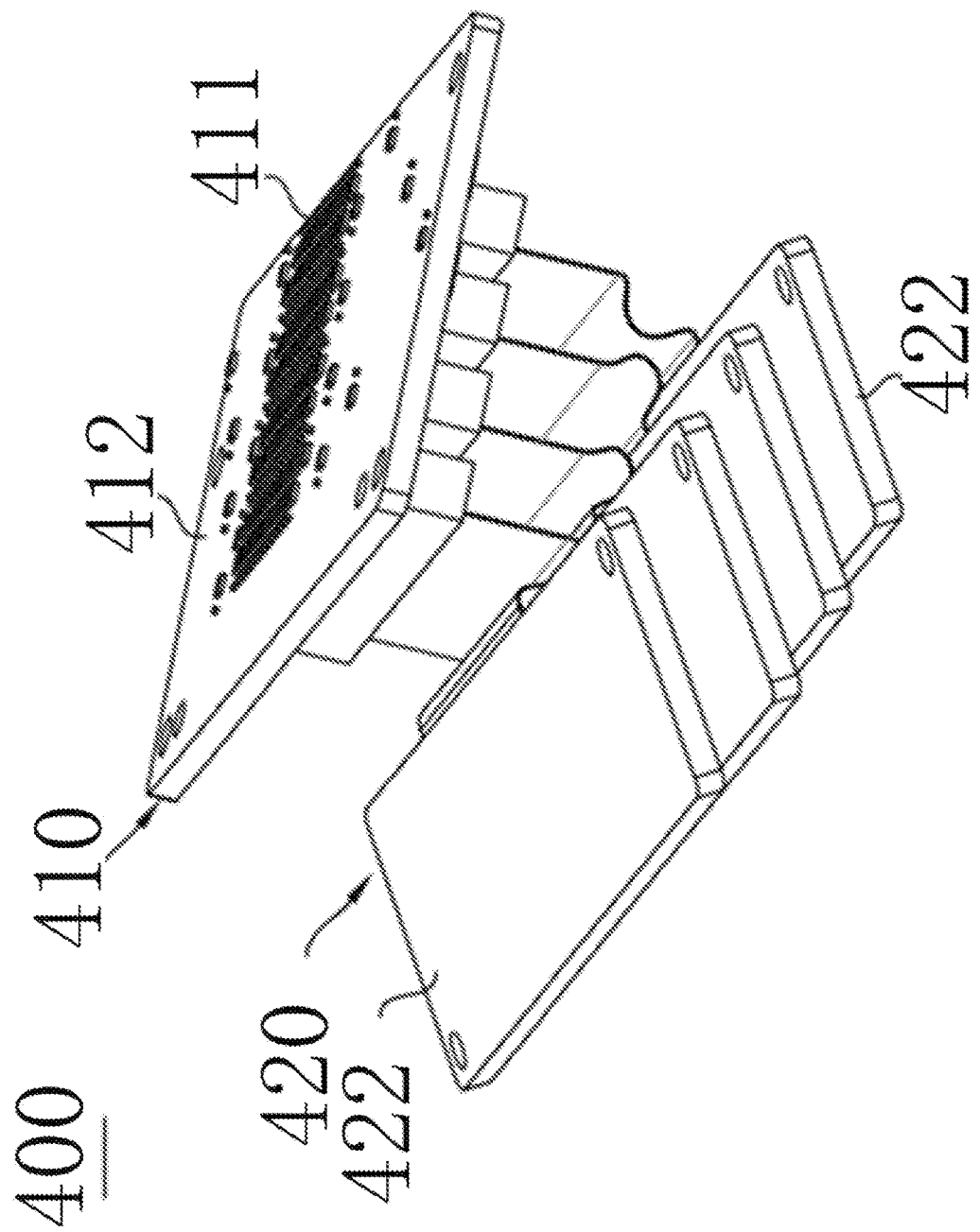
FIG. 9 is a 3D diagram of a sixth laser receiving device according to an embodiment of the present application.

Referring to FIG. 9, a photoelectric sensing assembly 410 of a laser receiving device 400 may include m receiving sensor plates 412 and n sensor groups 411, and the n sensor groups 411 are provided on the m receiving sensor plates 412. An amplifying assembly 420 may include k receiving amplifier plates 422 and n amplifier groups 421 (not shown in the figure), the n amplifier groups 421 are provided on the k receiving amplifier plates 422, the n amplifier groups 421 and the n sensor groups 411 can be electrically connected in a one-to-one manner. Herein, m is an integer greater than 0, n is an integer greater than 1, wherein m≤n; k is an integer greater than or equal to 1, wherein k≤n. In this way, the laser receiving device 400 may include n signal receiving channels, and each signal receiving channel include one sensor group 411 and one amplifier group 421, so that each amplifier group 421 can amplify and shape an electrical signal output by the corresponding sensor group 411, thereby increasing the signal processing speed of the amplifier group 421.

Figure 10:
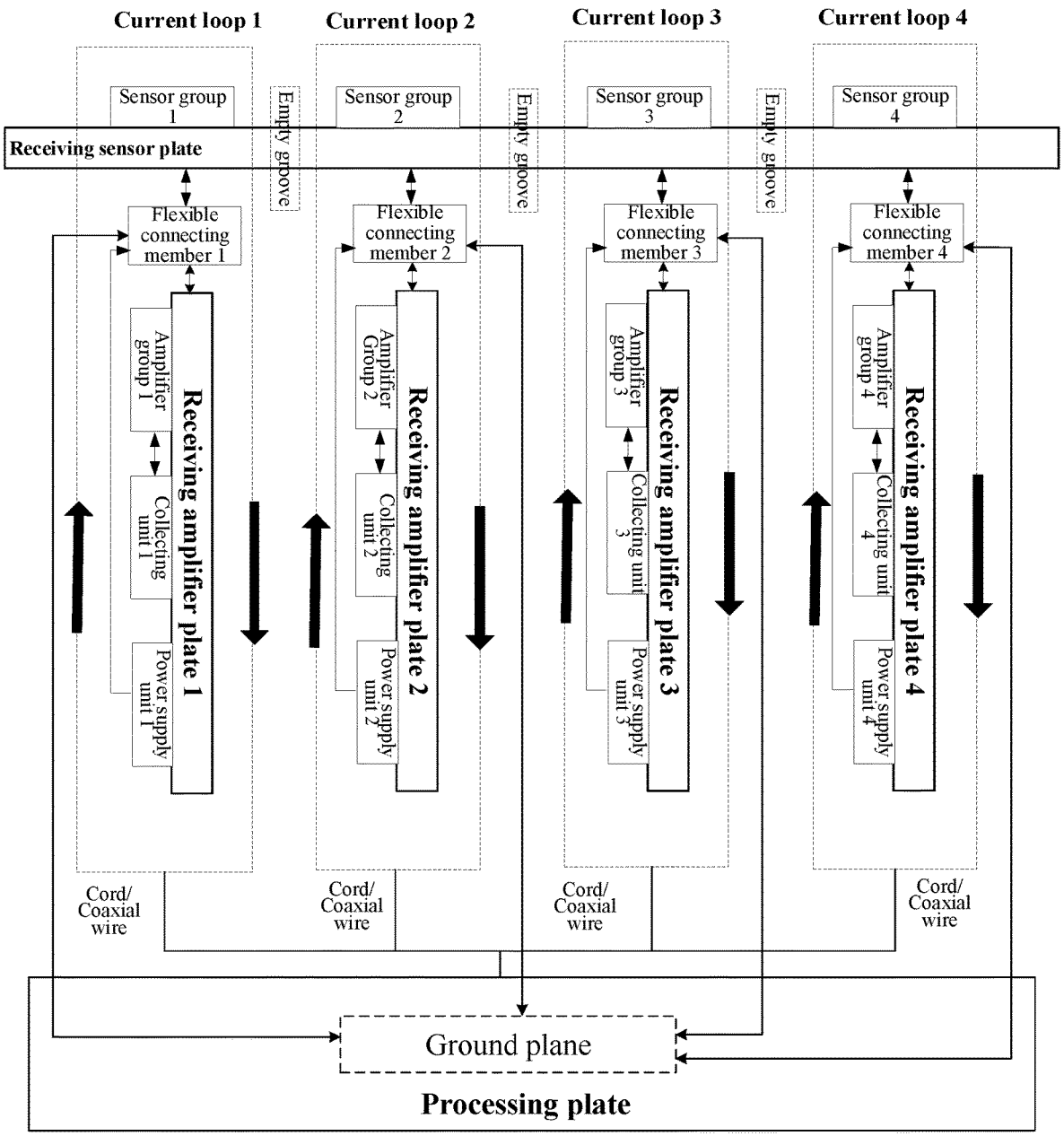
FIG. 10 is a structural block diagram of a seventh laser receiving device according to an embodiment of the present application.

Since the quantity of the receiving sensor plates 412 is less than or equal to the quantity of the sensor groups 411, at least one sensor group 411 may be provided on one receiving sensor plate 412. When the plurality of sensor groups 411 are provided on one receiving sensor plate 412, referring to FIG. 10, a first isolation part for electromagnetic shielding may be provided between two adjacent sensor groups 411 on the same receiving sensor plate 412, thereby preventing crosstalk generated by two adjacent sensor groups 411 via a metal line on the receiving sensor plate 412. In addition, when two adjacent sensor groups 411 are provided on different receiving sensor plates 412, since specific spacing is provided between the receiving sensor plates 412, and the possibility of crosstalk generated between two adjacent sensor groups 411 is low, a first isolation part may or may not be provided between two adjacent sensor groups. When two adjacent sensor groups 411 are located on different receiving sensor plates 412 and a first isolation part is provided between the two adjacent sensor groups 411, the first isolation part may be provided on at least one of the different receiving sensor plates 412.

For example, the photoelectric sensing assembly 410 may include two receiving sensor plates 412 and three sensor groups 411, and the two receiving sensor plates 412 may be denoted as the first receiving sensor plate and the second receiving sensor plate. Three sensor groups 411 may be denoted as the first sensor group, the second sensor group, and the third sensor group. The first sensor group can be provided on the first receiving sensor plate, the second sensor group and the third sensor group can both be provided on the second receiving sensor plate, and a first isolation part is provided between the second sensor group and the third sensor group.

In another example, the photoelectric sensing assembly 410 may include one receiving sensor plate 412 and three sensor groups 411. The three sensor groups 411 may be denoted as the first sensor group, the second sensor group, and the third sensor group. The first sensor group, the second sensor group, and the third sensor group may be successively provided on a same receiving sensor plate 412, a first isolation part is provided between the first sensor group and the second sensor group, and another first isolation part is provided between the second sensor group and the third sensor group.

In another example, the photoelectric sensing assembly 410 may include two receiving sensor plates 412 and two sensor groups 411. The two receiving sensor plates 412 may be denoted as the first receiving sensor plate and the second receiving sensor plate. The two sensor groups 411 may be denoted as the first sensor group and the second sensor group. The first sensor group can be provided on the first receiving sensor plate, and the second sensor group can be provided on the second receiving sensor plate. Because the first sensor group and the second sensor group are provided on different receiving sensor plates 412, the first isolation part may not be provided between the two sensor groups.

Since the quantity of the receiving amplifier plates 422 is less than or equal to the quantity of the amplifier groups 421, at least one amplifier group 421 may be provided on one receiving amplifier plate 422. When the plurality of amplifier groups 421 are provided on one receiving amplifier plate 422, a second isolation part for electromagnetic shielding may be provided between two adjacent amplifier groups 421 on the same receiving amplifier plate 422, thereby preventing the two adjacent amplifier groups 421 from crosstalk via a metal wire on the receiving amplifier plate 422. When two adjacent amplifier groups 421 are provided on different receiving amplifier plates 422, since specific spacing is provided between different receiving amplifier plates 422, and the possibility of crosstalk generated between the two adjacent amplifier groups 421 is low, the second isolation part may or may not be provided between two adjacent amplifier groups. When two adjacent amplifier groups 421 are located on different receiving amplifier plates 422 and the second isolation part is provided between the two adjacent amplifier groups, the second isolation part may be provided on at least one of the different receiving amplifier plates.

Both the first isolation part and the second isolation part may be grooves for electromagnetic shielding. Using the first isolation part as an example, the empty groove may be a hollowed-out region on the receiving sensor plate 412. No wiring and copper are allowed in the hollowed-out region. An opening of a specific length and depth can also be milled in the hollowed-out region, thereby realizing spatial isolation between two adjacent sensor groups 411 with respect to the wiring and the ground, and confining a current loop of each sensor group 411 within the group.

Optionally, the quantity of receiving amplifier plates 422 may be equal to the quantity of amplifier groups 421, that is, n=k. In this case, each receiving amplifier plate 422 may be provided with one amplifier group 121. The receiving amplifier plate 422 and the amplifier group 421 are designed in a one-to-one correspondence. Therefore, the position adjustment of multiple receiving amplifier plates 422 can be more flexible than that of a single receiving amplifier plate 422, and flexible adjustment can be made according to specific space requirements, which is potentially more broadly applied. For example, as shown in FIG. 9, the multiple receiving amplifier plates 422 may be stacked.

The amplifier is the main heat source in the laser receiving device 400. To reduce the impact of the heating of the amplifier on the performance of the sensor, only one amplifier can operate in each amplifier group 421 in the embodiments of this application, so that the receiving amplifier plate 422 has uniform distribution of the heat source, thereby being conducive to the heat dissipation of a plate card, lowering the overall temperature of the laser receiving device 400, reducing the temperature difference between different positions in a receiving cavity, and improving the performance consistency of devices distributed in each position.

Optionally, there may be one receiving sensor plate 412, that is, m=1. In this case, n sensor groups 411 may be provided on a same receiving sensor plate 412. Then sensor groups 411 are provided on the same receiving sensor plate 412, so that all the sensor groups 411 are on the same plane, thereby facilitating reception of an echo laser signal. Further, optionally, when n sensor groups 411 are provided on the same receiving sensor plate 412, a first isolation part may be provided between any two adjacent sensor groups 411, to prevent the two adjacent sensor groups 411 from crosstalk via a metal wire on the receiving sensor plate 412.

The photoelectric sensing assembly 410 may include one receiving sensor plate 412 and four sensor groups 411, that is, m=1 and n=4. In this case, each sensor group 411 may include 32 sensors. In this way, the laser receiving device 400 includes a total of 128 sensors, which can implement a 128-line LiDAR, and the 128 sensors are divided into four sensor groups 411, which can implement four signal receiving channels, thereby ensuring performance of parallel systems while reducing receiving space.

Optionally, when there are one receiving sensor plate 412 and multiple receiving amplifier plates 422, at least one receiving amplifier plate 422 and the receiving sensor plate 412 may be electrically connected through a flexible connecting member 430. Preferably, each receiving amplifier plate 422 and the receiving sensor plate 412 can be electrically connected through a flexible connecting member 430. Specifically, each receiving amplifier plate 422 and a corresponding flexible connecting member 430 can form a rigid-flex plate, the receiving sensor plate 412 can be provided with a connector 4121 corresponding to each rigid-flex plate, each connector 4121 has an electrical interface, and each rigid-flex plate can be provided with an edge connector 431 inserted into the corresponding electrical interface. The multiple connectors 4121 on the receiving sensor plate 412 may be located on the same plate surface of the receiving sensor plate 412, and may be distributed in an array on the same plate surface of the receiving sensor plate 412. Preferably, the receiving sensor plate 412 may have the first plate surface 4122 and the second plate surface 4123 opposite thereto. The sensor groups 411 may all be located on the first plate surface 4122, and the multiple connectors 4121 may all be located on the second plate surface 4123.

Figure 11:
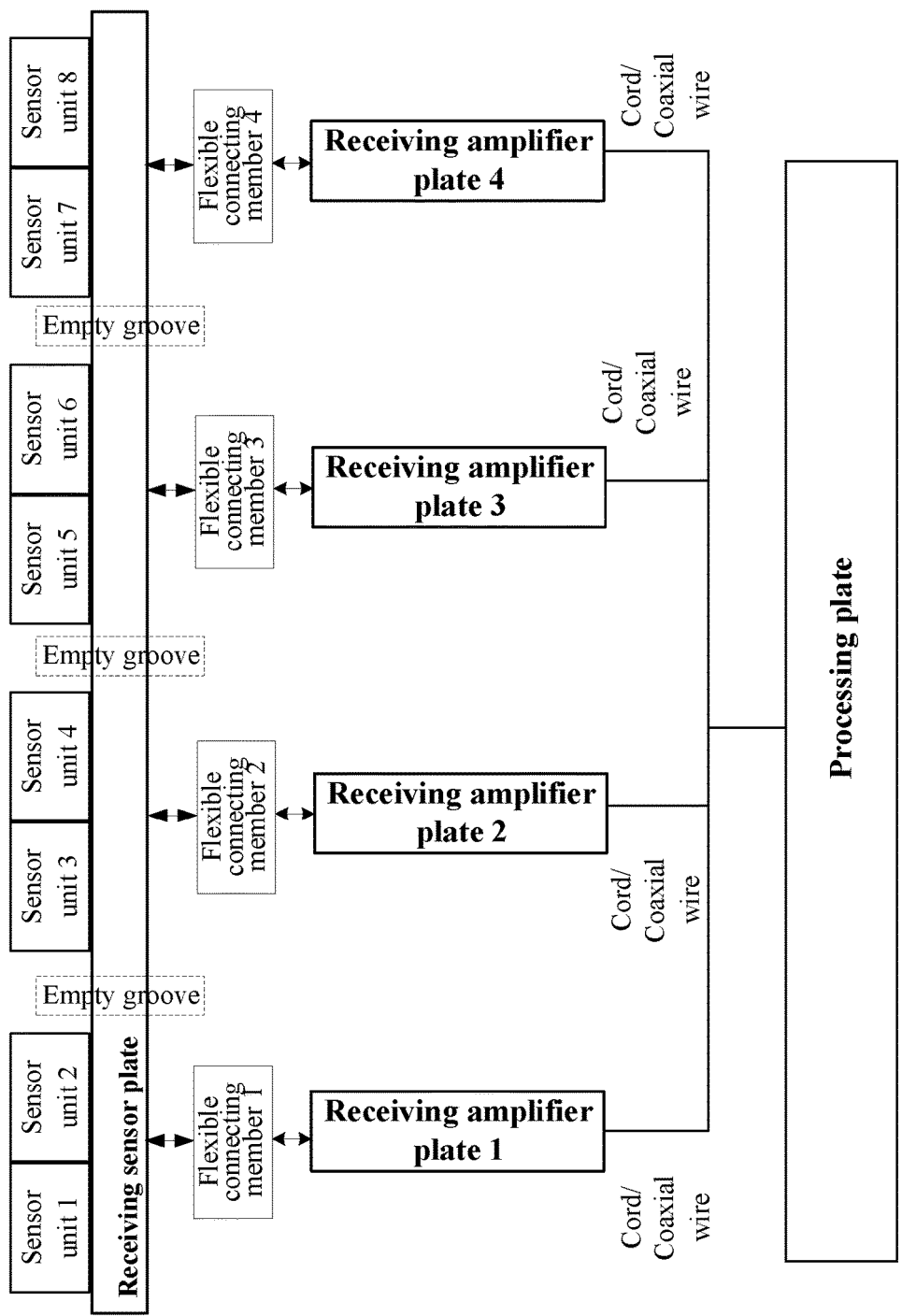
FIG. 11 is a structural block diagram of an eighth laser receiving device according to an embodiment of the present application.

Referring to FIG. 11, 32 sensors in each sensor group 411 can be divided into two sensor units. Each sensor unit can include 16 sensors, and the 16 sensors in each sensor unit are connected in series. Two sensor units in each sensor group 411 are connected in parallel and electronically connected to the amplifier group 421 in a one-to-one manner. An electrical closed loop is formed in each sensor unit and the working manner is a series connection manner. The working manner of the two sensor units in each sensor group 411 are the series connection manner and independent of each other. Thus, electrical isolation of the two sensor units in the sensor group 411 is implemented, thereby effectively and significantly reducing mutual electrical crosstalk, optimizing a signal-to-noise ratio, and improving accuracy of laser detection.

Optionally, the 16 sensors in each sensor unit may be distributed and spaced along a first direction, and the two sensor units in each sensor group 411 may be distributed and spaced along a second direction. The second direction may intersect with the first direction, so that a layout of the 128 sensors is relatively compact, thereby implementing the miniaturization of the receiving sensor plate 412.

An angle between the first direction and the second direction can be any value. For example, an angle between the first direction and the second direction may be 15°, 45°, 60°, 90°, or the like. Preferably, the angle between the first direction and the second direction may be 90°, so that the layout of the sensor can be more compact.

The laser receiving device 400 may also include a collecting assembly. The collecting assembly may include a collecting unit electrically connected to the amplifier group 121. When there are n amplifier groups 121 and n collecting units, the n collecting units and the n amplifier groups 121 may be electrically connected in a one-to-one manner. The collecting assembly can be configured to collect an electrical signal output by the amplifying assembly 120, and n collecting units can implement parallel signal collection on n signal receiving channels. For example, the collecting unit can include an analog-to-digital converter and/or a time-to-digital converter.

In an exemplary solution, the collecting unit may be directly provided on the receiving amplifier plate 422, so that the layout of the laser receiving device 400 is compact, thereby implementing miniaturization. For example, when there are n receiving amplifier plates 422 and n collecting units, each receiving amplifier plate 422 may be provided with one collecting unit. The collecting unit and the amplifier group 421 may be connected through a cord or a coaxial wire on the amplifier plate. In another exemplary solution, the collecting assembly may further include a collecting plate electrically connected to the collecting unit, and the collecting plate can be configured to hold the collecting unit and provide a control signal, an electrical signal, or the like for the collecting unit. The collecting unit is provided on the collecting plate, so that the collecting unit can be integrated with the collecting plate and then integrated with the amplifying assembly 420, or the like independently.

The laser receiving device 400 may further include a power supply unit. The power supply unit can be configured to supply power to the photoelectric sensing assembly 410 and the amplifying assembly 420. When there are n amplifier groups 421 and n sensor groups 411, there may be n power supply units, and the n power supply units and n amplifier groups 421 can be electrically connected in a one-to-one manner. The n power supply units and the n sensor groups 411 may be electrically connected in a one-to-one manner, and each sensor group 411 in the photoelectric sensing assembly 410 and each amplifier group 421 in the amplifying assembly 420 may be combined to the same ground plane for grounding. Optionally, the photoelectric sensing assembly 410 and the amplifying assembly 420 may be grounded on the same ground plane via magnetic beads or a 0-ohm resistor.

Optionally, the power supply unit may be provided on the receiving amplifier plate 422. When there are n receiving amplifier plates 422 and n power supply units, each receiving amplifier plate 422 may be provided with one power supply unit. When the quantity k of receiving amplifier plates 422 is less than n, if n power supply units are provided on the k receiving amplifier plates 422, one or more power supply units may be provided on each receiving amplifier plate 422. Optionally, when multiple power supply units are provided on one receiving amplifier plate 422, two adjacent power supply units may be isolated by a filter device. The filter device may include one or more of a low dropout (LDO) linear voltage stabilizer, a passive filter, and the magnetic beads, to reduce the crosstalk between the power supply units.

Optionally, the signal transmission path length of each signal receiving channel may be equal. For example, the signal receiving channel includes the sensor group 411, the amplifier group 421, the collecting unit, and the power supply unit. The signal transmission path length is the length of the signals passing through the sensor group 411 and the amplifier group 421 to the collecting unit, thereby keeping the consistency of each signal receiving channel, and improving synchronization performance.

Figure 12:
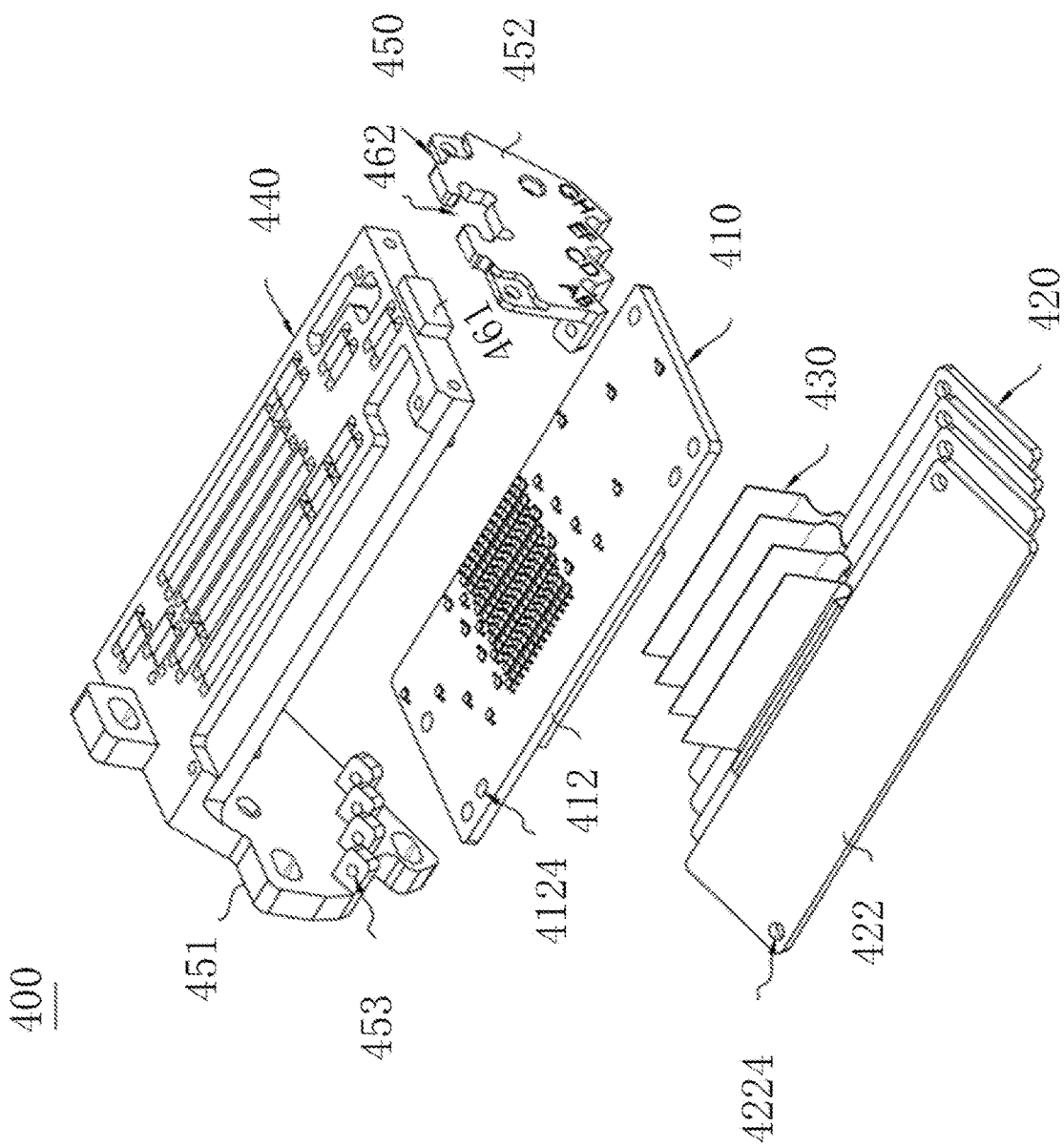
FIG. 12 is an exploded view of a ninth laser receiving device according to an embodiment of the present application.

Referring to FIG. 12, the laser receiving device 400 may further include a diaphragm 440. After an echo laser signal passes through the diaphragm 440 and reaches the photoelectric sensing assembly 410, the diaphragm 440 is configured to reduce an optical crosstalk problem when the laser receiving device 400 receives the laser signal.

The laser receiving device 400 may further include a mounting bracket 450. The photoelectric sensing assembly 410, the amplifying assembly 420, and the diaphragm 440 can all be connected to the mounting bracket 450, to implement the installation and fixation of the photoelectric sensing assembly 410, the amplifying assembly 420, and the diaphragm 440. Optionally, the mounting bracket 450 may include at least one connecting portion, and the photoelectric sensing assembly 410, the amplifying assembly 420, and the diaphragm 440 may all be connected to the connecting portion.

Optionally, the mounting bracket 450 may include two connecting portions that may be respectively denoted as a first connecting portion 451 and a second connecting portion 452. The first connecting portion 451 and the second connecting portion 452 may be spaced, and the photoelectric sensing assembly 410, the amplifying assembly 420, and the diaphragm 440 can all be connected between the first connecting portion 451 and the second connecting portion 452.

A connection between the two connecting portions on the one hand and the photoelectric sensing assembly 410, the amplifying assembly 420, and the diaphragm 440 on the other hand may be a fixed connection or a detachable connection. Optionally, a connection between the first connecting portion 451 and the diaphragm 440 may be a fixed connection, and a connection between the second connecting portion 452 and the diaphragm 440 may be a detachable connection. For example, the first connecting portion 451 may be integrated with the diaphragm 440, and the second connecting portion 452 may be snap-fit connected to the diaphragm 440. The snap-fit connection may be a connection between a card 461 and a card slot 462 or the like.

Optionally, the receiving sensor plate 412 of the photoelectric sensing assembly 410 may be clamped by the first connecting portion 451 and the second connecting portion 452. Optionally, a first positioning member 4124 may be provided on the receiving sensor plate 412, a second positioning member matching the first positioning member 4124 may be provided on the diaphragm 440, and the first positioning member 4124 is connected to the second positioning member, to implement accurate installation and stable fixation of the receiving sensor plate 412. The first positioning member 4124 may be one of a positioning pillar and a positioning hole, and the second positioning member may be the other one of the positioning pillar and the positioning hole.

Optionally, the receiving amplifier plate 422 of the amplifying assembly 420 may be connected to the first connecting portion 451 and/or the second connecting portion 452 via a locking member. Specifically, the first connecting portion 451 and/or the second connecting portion 452 may be provided with a first mounting hole 453, and the receiving amplifier plate 422 may be provided with a second mounting hole 4224 matching the first mounting hole 453. The locking member may be provided in the first mounting hole 453 and the second mounting hole 4224. The locking member can be a bolt or the like. When there are multiple receiving amplifier plates 422, each receiving amplifier plate 422 may be connected to the first connecting portion 451 and/or the second connecting portion 452 by a locking member.

Figure 7:
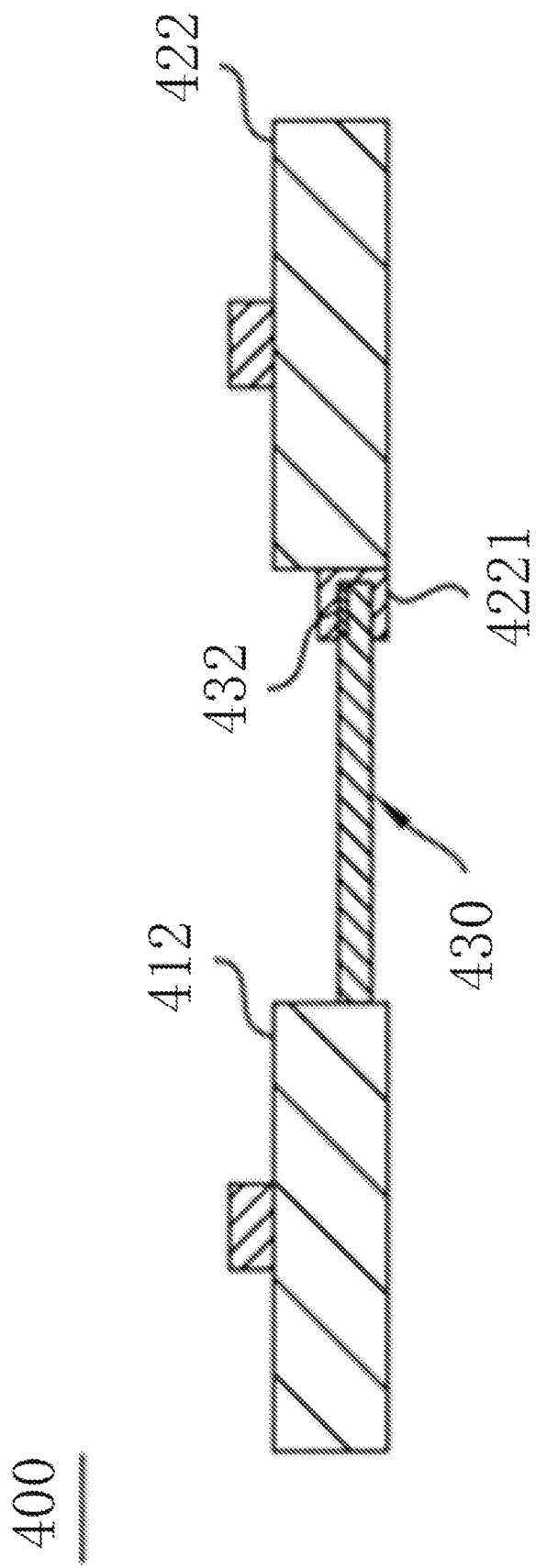
FIG. 7 is a cutaway view of a fourth laser receiving device according to an embodiment of the present application.

During the use of the laser receiving device 400 disclosed in the embodiments of the present disclosure, n power supply units supply power to n amplifier groups 421 in the amplifying assembly 420 and n sensor groups 411 in the photoelectric sensing assembly 410 respectively. The sensor group 411 includes a plurality of sensors. Only one sensor can operate at a time. The sensor is configured to convert the echo laser signals into electrical signals. The sensor can be a photodiode. The amplifier group 421 includes a plurality of amplifiers. The amplifier is configured to amplify and rectify the electrical signals output by the sensor. The collecting unit is configured to rectify the electrical signals output by the amplifier. The laser receiving device 400 of this application includes n signal receiving channels. N signal receiving channels include one sensor group 411, one amplifier group 421, one collecting unit, and one power supply unit, respectively. According to the structure of the laser receiving device 400 in the embodiments of the present disclosure, each signal receiving channel forms an independent current loop, for example, as shown in FIG. 7, a circuit loop 1, a current loop 2, a current loop 3 and a current loop 4, which can reduce noise crosstalk between the signal receiving channels and improve the signal-to-noise ratio of the laser receiving device 100.

In a second aspect, this application provides a LiDAR. The LiDAR includes the laser receiving device 400 described above. The LiDAR may also include a laser emitting device. The laser emitting device may be configured to emit a laser signal to an object, and the laser receiving device 400 is configured to receive an echo laser signal formed after the emitted laser signal is reflected back by the object.

The various embodiments in this specification are described in a progressive manner. The same or similar parts between the various embodiments can be referred to each other. Each embodiment focuses on the difference from other embodiments. In particular, as for a system embodiment, since the system embodiment is basically similar to a method embodiment, the description is relatively simple. For related parts, please refer to the part of the description of the method embodiment.

The embodiments of the present disclosure described above do not constitute a limitation on the protection scope of the present disclosure. Any modification, equivalent replacement and improvement made within the spirit and principle of the present disclosure shall be included within the protection scope of the present application.

What is claimed is:

1. A laser receiving device, comprising:
a photoelectric sensing assembly, comprising m receiving sensor plates and n sensor groups, wherein the n sensor groups are arranged on the m receiving sensor plates, when two adjacent sensor groups are arranged on the same receiving sensor plate, a first isolation part for electromagnetic shielding is arranged between the two adjacent sensor groups, wherein m is an integer greater than 1, n is an integer greater than 1, and m≤n;
an amplifying assembly, comprising k receiving amplifier plates and n amplifier groups, wherein the n amplifier groups are arranged on the k receiving amplifier plates, when two adjacent amplifier groups are arranged on the same receiving amplifier plate, a second isolation part for electromagnetic shielding is provided between the two adjacent amplifier groups, and the n amplifier groups and the n sensor groups are connected in a one-to-one manner, wherein k is an integer greater than 1, and k≤n;
a collecting assembly, comprising a collecting plate and n collecting units, wherein the n collecting units are arranged on the collecting plate, and the n collecting units and the n amplifier groups are connected in a one-to-one manner;
n power supply units, configured to supply power to the photoelectric sensing assembly and the amplifying assembly, wherein the n power supply units are connected to the n amplifier groups in a one-to-one manner, the n power supply units are connected to the n sensor groups in a one-to-one manner, and the photoelectric sensing assembly and the amplifying assembly are grounded via a same ground plane; and
n signal receiving channels in parallel, wherein each signal receiving channel corresponds to one amplifier group, one sensor group, one collecting unit, and one power supply unit, wherein the one power supply unit, the one sensor group, the one amplifier group, and the one collecting unit operate serially in groups and are parallel among groups,
wherein the sensors and the amplifiers in a group share the power supply unit, the collecting unit, and the ground plane; and
the one power supply unit, the one sensor group, and the one amplifier group are grounded on the one collecting unit to form a closed current loop corresponding to each signal receiving channel.

2. The laser receiving device according to claim 1, wherein m=1, the n sensor groups are arranged on the same receiving sensor plate, and a first isolation part is arranged between any two adjacent sensor groups.

3. The laser receiving device according to claim 1, wherein k=n, and one amplifier group is arranged on each receiving amplifier plate.

4. The laser receiving device according to claim 1, wherein the first isolation part is an empty groove arranged on the receiving sensor plate, and the second isolation part is an empty groove arranged on the receiving amplifier plate.

5. The laser receiving device according to claim 1, wherein the ground plane is arranged on the collecting plate.

6. The laser receiving device according to claim 1, wherein the n power supply units are arranged on the collecting plate or on the k receiving amplifier plates.

7. The laser receiving device according to claim 1, further comprising a plurality of first connecting members and a plurality of second connecting members,
wherein one of the k receiving amplifier plates is connected to one of the m receiving sensor plates via one of the plurality of first connecting members, one of the k receiving amplifier plates is connected to the collecting plate via one of the plurality of second connecting members, and the plurality of the first connecting members and the plurality of the second connecting members include one of a plate-to-plate connector, a wire, or a flexible printed circuit (FPC).

8. The laser receiving device according to claim 7, wherein at least one the n sensor groups is arranged on an upper surface of one of the m receiving sensor plates, and at least one of the plurality of first connecting members is arranged on a lower surface of one of the m receiving sensor plates.

9. The laser receiving device according to claim 1, wherein the photoelectric sensing assembly and the amplifying assembly are grounded on the same ground plane via one or both of a magnetic bead and a 0-ohm resistor.

10. The laser receiving device according to claim 1, wherein two adjacent power supply units are isolated by a filter device; and the filter device comprises one or more of a low dropout voltage linear stabilizer, a passive filter, and the magnetic beads.

11. The laser receiving device according to claim 1, wherein a plurality of signal receiving channels have an equal signal transmission path length.

* * * * *